Feb. 8, 1966  J. M. DARFUS  3,233,758
LIFT GATE
Filed May 4, 1964  5 Sheets-Sheet 1

INVENTOR.
JOHN M. DARFUS
BY
MAHONEY, MILLER & RAMBO
BY
ATTORNEYS.

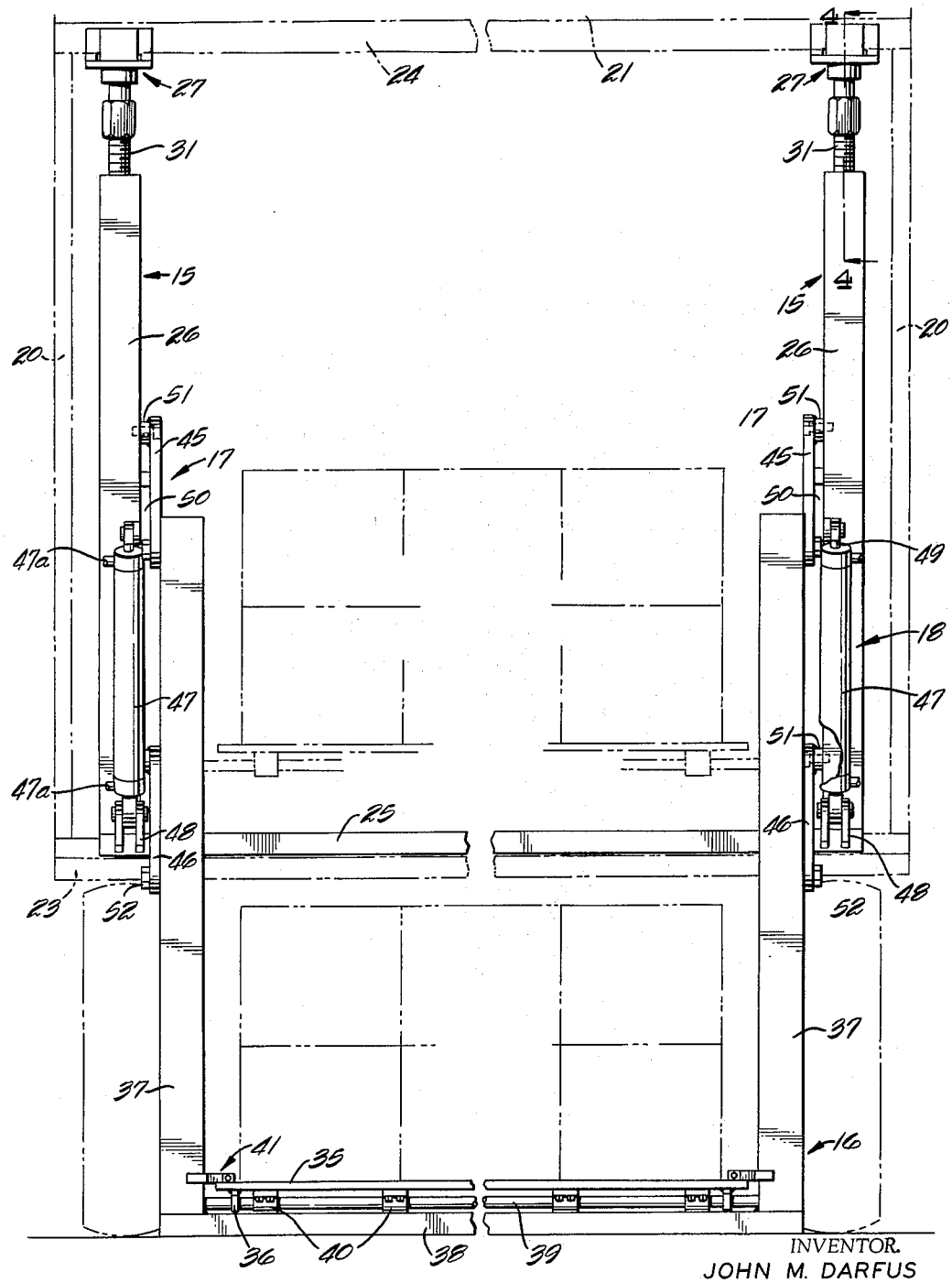

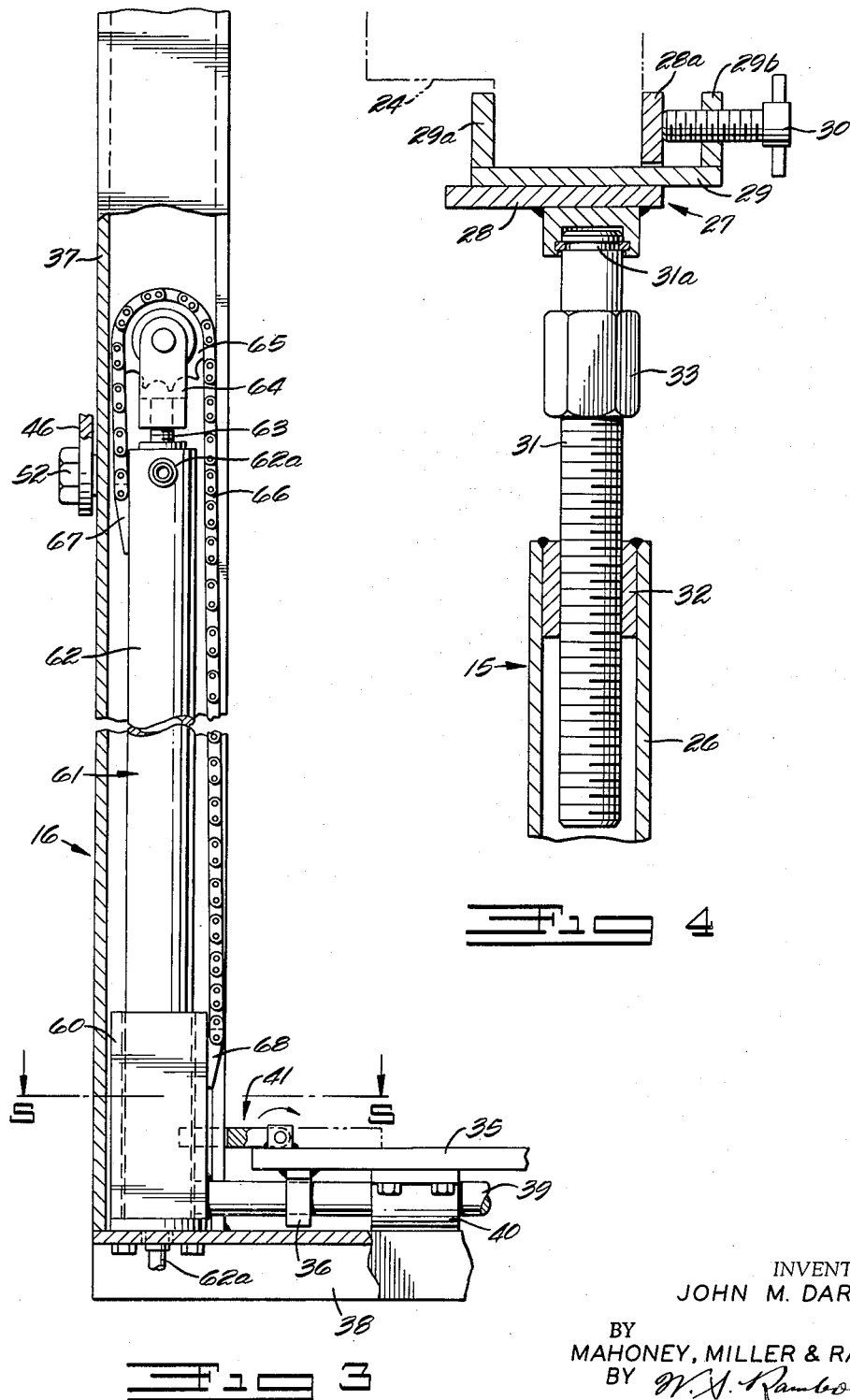

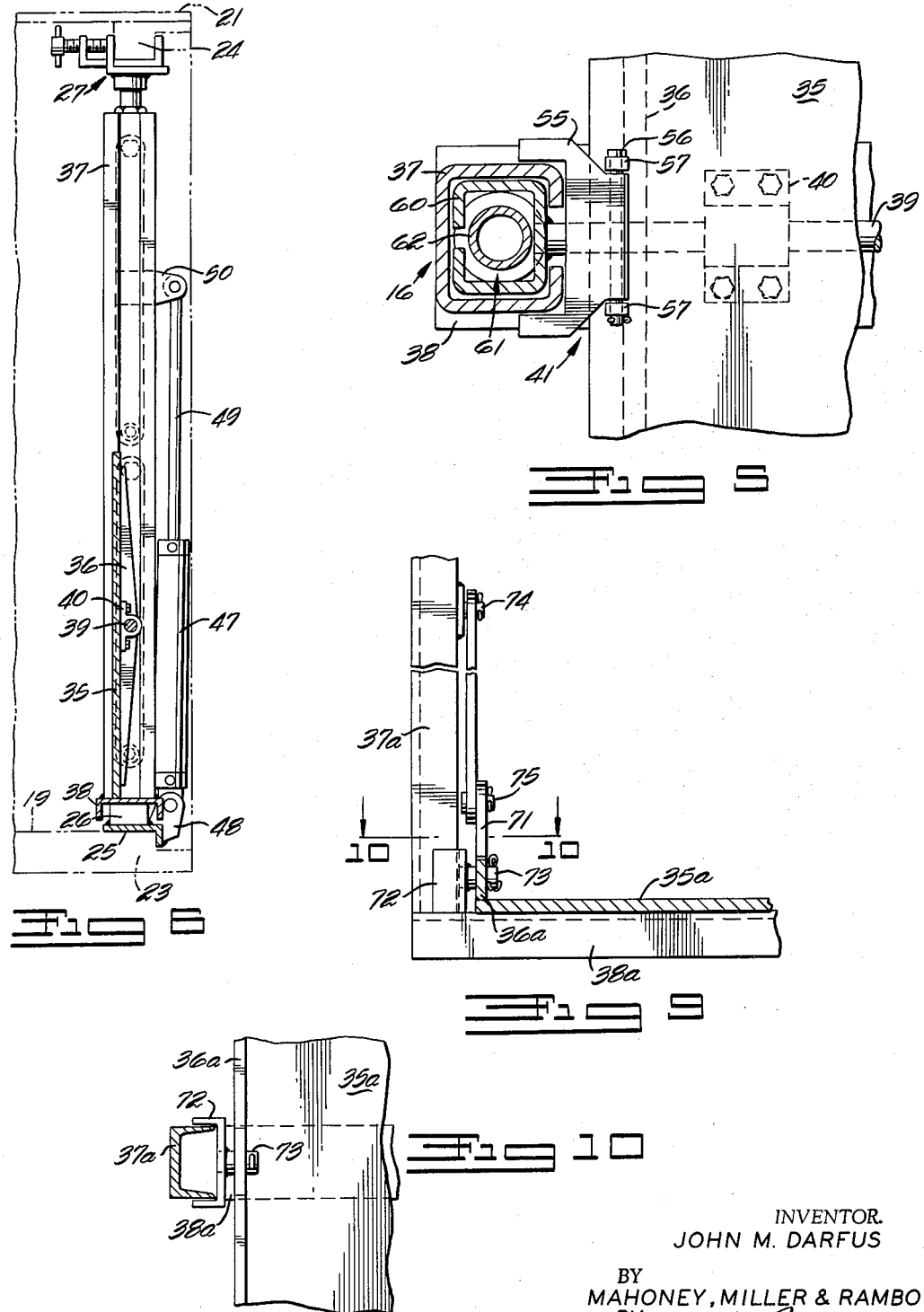

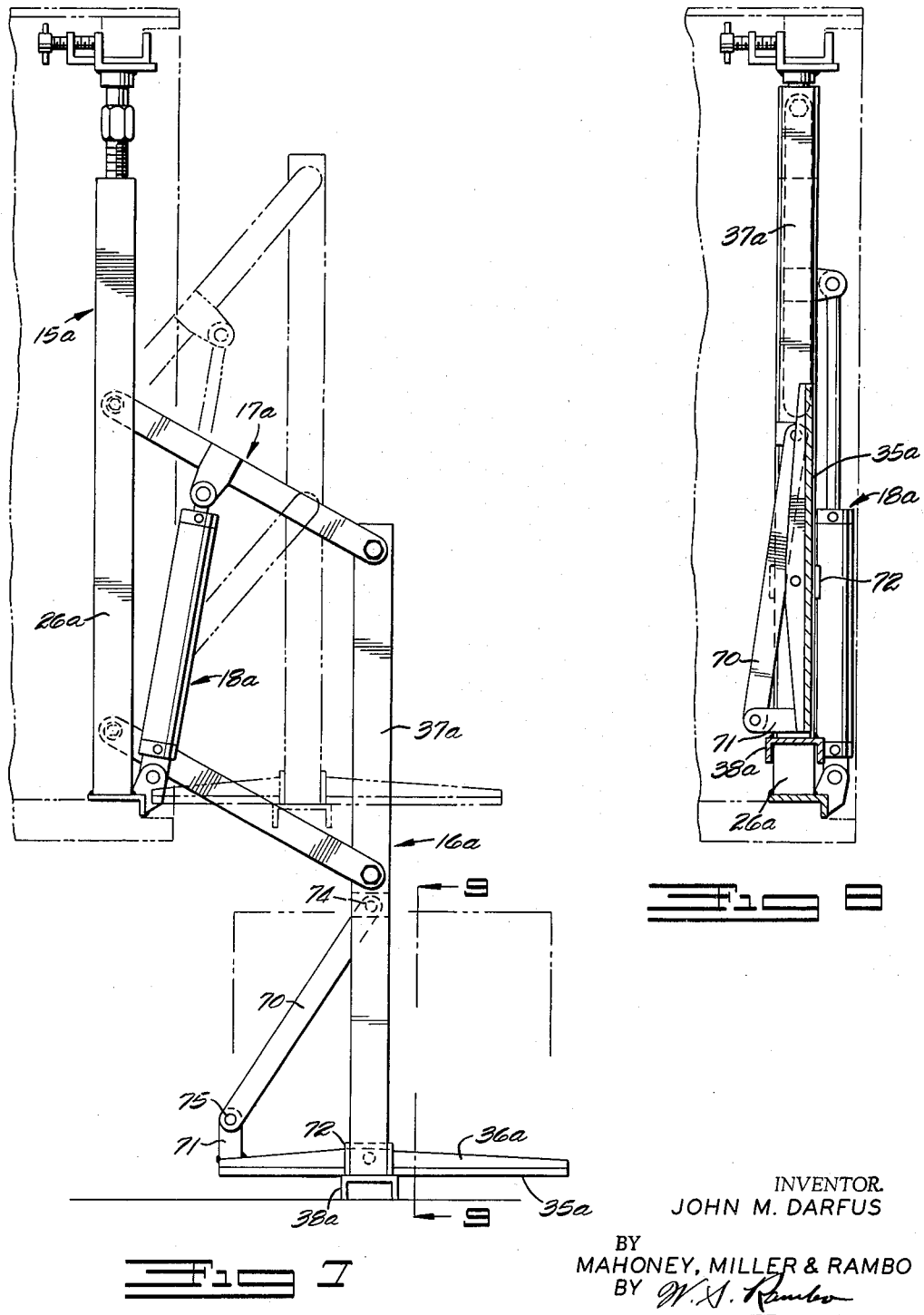

United States Patent Office 3,233,758
Patented Feb. 8, 1966

3,233,758
LIFT GATE
John M. Darfus, Columbus, Ohio, assignor to Penntruck Company, Inc., Columbus, Ohio, a corporation of Indiana
Filed May 4, 1964, Ser. No. 364,496
7 Claims. (Cl. 214—75)

This invention relates, in general, to a lift gate of the type adapted for installation on a cargo-carrying vehicle. It relates, more specifically, to a lift gate of this type designed for portability in that it may be removably mounted on a vehicle at the rear of the cargo-carrying space.

Lift gates have been designed heretofore for mounting on the rear of cargo-carrying vehicles for the specific purpose of facilitating handling of cargo. These lift gates are extremely useful in that relatively heavy loads may be easily elevated the four or five feet to the truck bed. The advantage of such apparatus is readily apparent where a loading dock or other similar facilities may not be readily available. For example, the handling of heavy boxes or other articles is extremely difficult where the articles are initially positioned on the ground and are to be transferred to the truck or, as in the reverse situation, the loads are to be transferred from the truck bed to the ground. As is well known, the lift gates of prior construction are designed for permanent mounting on the truck body and will always be carried with the truck. These gates are usually constructed with hydraulically-actuated mechanical linkages to elevate a cargo-supporting platform between a loading position relative to the truck bed and a second loading position at a vertically displaced location, such as the ground. Although these lift gates are extremely useful they are a relatively costly unit to be attached to a truck should the truck not be continuously operated in service where the gate may be most effectively utilized. It often happens that a truck operated by a common carrier will be utilized under widely diversified operating conditions. Some of the operations of a specific truck may be between stations where loading docks are available. In this instance, a lift gate will not be needed and, should a lift gate be installed on the truck, would result in ineffective and inefficient utilization of the equipment. As a second example, the truck may be utilized between loading and discharge stations where one would be provided with a loading dock and the other would not. Consequently, it has been the practice for reasons of economy to attempt to schedule vehicle operations to most efficiently and effectively utilize those which are provided with lift gates. This is not always possible and often results in confusion of scheduling and also some uneconomical utilization of the lift gate type trucks. Another practice that is becoming extensive in the transportation industry is that of exchanging trailer equipment or truck equipment and it is not acceptable to exchange trailers with lift gates for those without. Therefore, a trailer or truck body provided with a lift gate that is permanently attached thereto must necessarily remain with the owner and accordingly limits his utilization. The prior art lift gates that are permanently attached to the vehicles are generally of an exteriorly mounting construction where the cargo-supporting platform will be disposed in a transport position which extends rearwardly of the truck body. This extension of the truck body must be included in the overall length restrictions applicable to the truck and results in a reduction in the allowable length of the truck body for compliance with the truck regulations and restrictions.

It is, therefore, the primary object of this invention to provide a lift gate for cargo-carrying vehicles which may be removably mounted on the vehicle.

It is another object of this invention to provide a lift gate which may be removably mounted on the vehicle and which may be adapted to fit within the cargo-carrying space when not being utilized to thereby reduce the overall length of the vehicle.

Another object of this invention is to provide a lift gate which is detachably mountable on a vehicle and which is of rugged construction and capable of providing a vertical lift from the ground level to a level substantially above the cargo-carrying floor of the vehicle.

These and other objects and advantages of this invention will be readily apparent from the following detailed description thereof and the accompanying drawings.

In the drawings:

FIGURE 2 is a front elevational view of the lift gate of FIGURE 1.

FIGURE 3 is an enlarged, vertical sectional view of a vertical strut of the cargo-supporting platform taken along line 3—3 of FIGURE 1.

FIGURE 4 is a vertical sectional view of the vertical adjustment mechanism and the header clamping apparatus, taken along line 4—4 of FIGURE 2.

FIGURE 5 is a horizontal sectional view, taken along line 5—5 of FIGURE 3.

FIGURE 6 is a medial vertical sectional view of the lift gate with the cargo-supporting platform in a stowed or transport position.

FIGURE 7 is a side elevational view of a lift gate embodying this invention in which the cargo-supporting platform is of modified construction.

FIGURE 8 is a medial vertical sectional view of the modified lift gate with the cargo-supporting platform in a stowed or transport position.

FIGURE 9 is an enlarged vertical sectional view taken along line 9—9 of FIGURE 7.

FIGURE 10 is a horizontal sectional view taken along line 10—10 of FIGURE 9.

Figure 1:
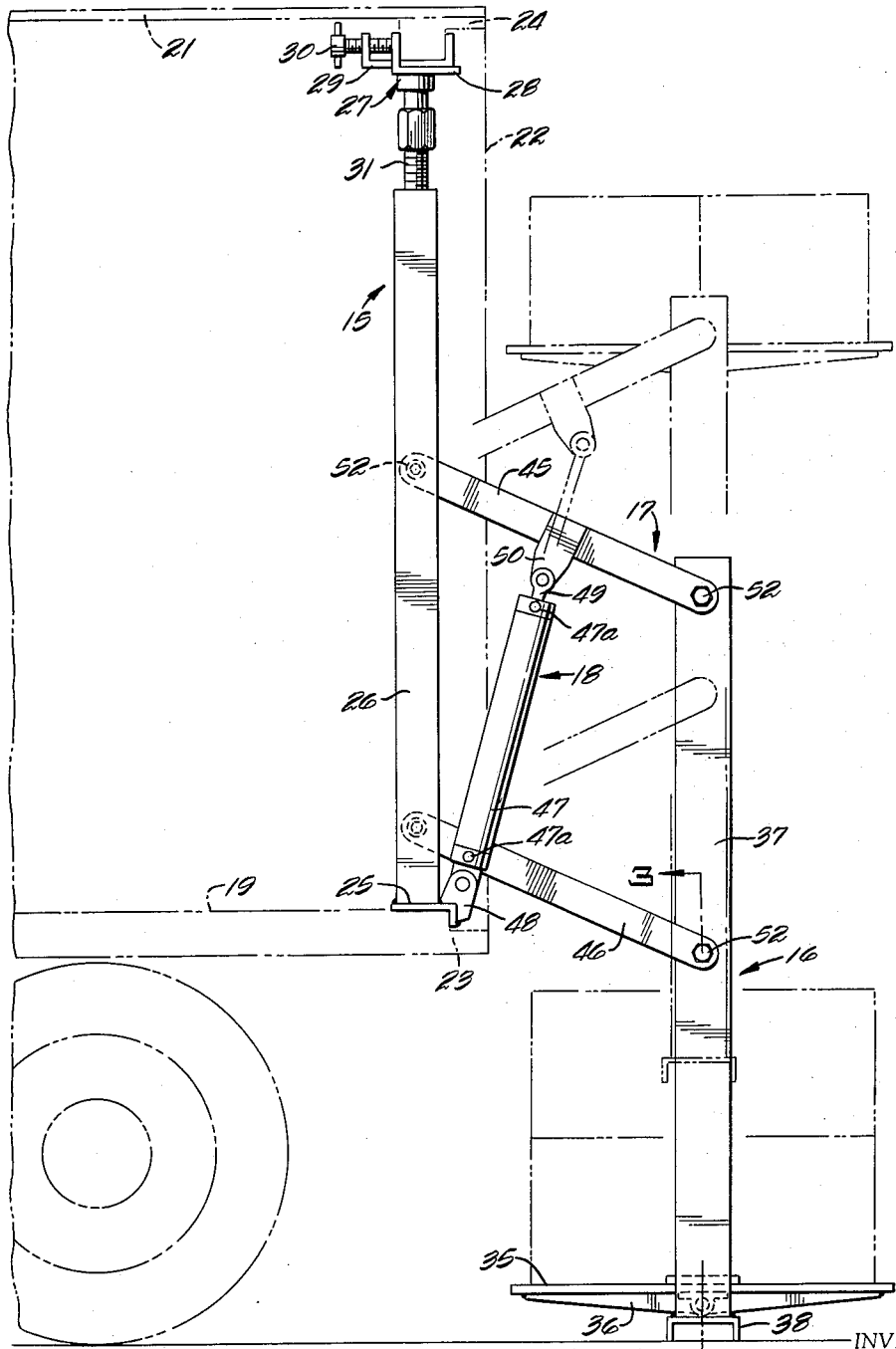
FIGURE 1 is a side elevational view of the preferred embodiment of the lift gate of this invention as mounted on a truck.

Having reference to the drawings, the lift gate, in its preferred form as is best shown in FIGURES 1 and 2, comprises a base frame structure 15, a cargo-supporting platform 16, a mechanical interconnecting linkage 17, and an actuating means 18. The lift gate is designed primarily for utilization with cargo-carrying vehicles having a closed, van-type body, such as is illustrated in FIGURES 1 and 2, which may be either of the trailer mounted or truck chassis type. The van-type body includes a truck bed or floor 19 on which the cargo is carried, opposed vertical side walls 20 and an upper roof or covering member 21. Also, since van-type body vehicles are usually intended for all-weather operation, the opening at the end of the cargo-carrying space would be provided with a suitable door structure which is not shown as the door constructions are well known and are not pertinent to the disclosure of this invention. However, the door that is normally provided would, when closed, be positioned across the opening as at line 22 to seal the rear of the vehicle. In the usual constructions of the van-type bodies, the truck bed is formed with a sill 23 having a vertical face extending across the rear and the van body is provided with a header 24 attached to the roof 21 and extending across the rear of the vehicle against which the doors will close.

The base frame structure 15 is designed to engage the truck body at the truck bed sill 23 and the header 24 to removably maintain the lift gate in position on the truck. Accordingly, the base frame structure includes an elongated L-shaped member 25 and two spaced-apart, vertically-extending struts or standards 26. The L-shaped member 25 extends substantially the width of the van body and engages the vertical face of the sill 23 thereby preventing inward displacement of the frame structure while being supported on the truck bed. The struts 26 are preferably fabricated from elongated, tubular columns which are welded at one end to the base member 25 and project upwardly toward the header 24. Attached to the upper end of each column is a sill or header-engaging clamp 27 which may be of the C-type as is illustrated. As best shown in FIGURE 4, the clamp 27 comprises a fixed jaw 28 and a relatively movable jaw 29. Both jaws 28 and 29 are formed with vertically projecting flanges 28a and 29a which are adapted to engage the header 24 in clamping relationship between their opposed faces. A clamping screw 30 is threaded through an upstanding bracket 29b of the movable jaw to engage the fixed jaw flange 28a and thereby effect a clamping force. The vertical struts 26 are spaced apart a distance substantially equal to the width of the van body to avoid unnecessarily obstructing the opening to the interior of the van body. It is a general practice to construct all van bodies with a standard width and the base member 25 may accordingly be fabricated with a standard width to fit within the van body. The height of the van body as determined by the distance between the floor 19 and the header 24, however, may vary considerably as between different makes or models of van bodies. A means for vertical adjustment of the columns 26 is, therefore, provided which will accommodate the usual variations encountered. This vertical adjustment means comprises a screwjack 31 having one end 31a journaled in the base of the fixed jaw member 28 of the header clamping device 27 and an elongated screw-threaded portion which is threaded into a sleeve 32 welded or otherwise secured in the upper end of the column 26. A hexagonal, wrench-engaging portion 33 may be formed intermediate the ends of the screwjack to facilitate the operation thereof.

The cargo-supporting platform 16 includes a rigid frame and a rectangularly-shaped plate 35 having a plurality of transversely-extending reinforcing ribs 36 welded or otherwise secured to the lower surface thereof. Forming the rigid frame of the cargo-supporting platform are a pair of upstanding columns 37 connected at their lower ends to an elongated, horizontally-disposed channel member 38. As will be best seen in FIGURE 2, the upstanding columns 37 are spaced apart a distance less than the spacing between the vertical struts 26 of the base frame structure. As will be more fully explained hereinafter, this will permit the cargo-supporting platform and its associated columns 37 to be positioned within the base frame structure when in a stowed position for transport by the vehicle, as indicated in FIGURE 6. Referring to FIGURES 2 and 3, the plate 35 is carried on a horizontally extending shaft 39 having each end terminating within the respective upstanding column 37. The shaft 39 extends through each of the reinforcing ribs 36 and is additionally secured to the plate 35 by means of several brackets 40 consisting of elongated, cylindrical sections having a shaft-receiving bore and provided with external bolt flanges for securing the bracket to the plate 35. The reinforcing ribs 36 and the bracket 40 normally permit relative rotational movement of the plate 35 about the shaft 39. A locking mechanism, denoted generally by the numeral 41, is accordingly provided to prevent rotation of the plate 35 when not so desired and maintain the plate in a cargo-supporting position.

Connected between each strut 26 of the base frame structure 15 and the associated upstanding column 37 of the cargo-supporting platform is the mechanical interconnecting linkage 17. This linkage is duplicated for each side of the apparatus and each side comprises a pair of rigid arms 45 and 46 which may be denoted as the upper and lower arms. Both arms 45 and 46 are of equal length and are pivotally connected at their ends to the respective strut 26 and column 37. The relative spacing of the pivotal connection of the arms 45 and 46 is the same on both the columns 37 and the struts 26 and the arms form a parallel arm linkage which maintains the columns 37 in parallel relationship to the struts 26. As is diagrammatically shown in FIGURES 1 and 2, pivotal movement of the arms 45 and 46 relative to the strut 26 will vertically elevate the columns 37 and the plate 35 of the cargo-supporting platform 16.

Each arm 45 and 46 is of the length sufficient to permit the plate 35 to be elevated past the rearmost edge of the sill 23. As is best shown in FIGURE 1, the length of the arms maintains the upstanding columns 37 at a distance spaced rearwardly from the end of the truck body to permit the plate 35 to be loaded with the articles or boxes without interference from the van body. In the position shown in FIGURE 1, the cargo-supporting platform 16 is positioned on the ground surface where the articles may be conveniently transferred to or from the plate 35. As the cargo-supporting platform 16 is elevated by means of the mechanical linkage 17 and the actuating mechanism 18, the columns 37 may be moved upwardly to position the plate 35 at a location substantially equal to the bed 19 of the truck body. In the position diagrammatically indicated in FIGURE 2, the articles may be conveniently transferred to or from the van body. Because of the pivotal, swinging movement of the arms 45 and 46, the columns 37 and the plate 35 will not only be vertically displaced but will traverse an arcuate path. As determined by the length of the arms 45 and 46, the arcuate movement will swing the platform 16 outwardly from the end of the van body but the horizontal displacement will be relatively slight in view of the long length of the arms 45 and 46 and the relatively small arc through which they travel.

An actuating means 18 is connected between the base frame structure 15 and the upper arm 45 to provide the necessary force for lifting of the cargo supporting platform 16. In the illustrated embodiment, the actuating means 18 comprises a pair of fluid-operated piston and cylinder actuator units each of which includes a cylinder 47 pivotally connected by a bracket assembly 48 to the base member 25, and a piston with outwardly-extending piston rod 49 pivotally connected by a bracket 50 to the upper arm 45.

Each bracket 50 is attached to its respective arm 45 at an intermediate point whereby a suitable lever arm is provided for the fluid actuators. Thus, when the cargo-supporting platform 16 is disposed in the lowered position (see FIG. 1), the actuators 18 will be inclined outwardly from the base frame structure 15 and will be able to transmit a lifting force to the cargo-supporting platform. Extension of the piston rods 49 will swing the arms 45 and 46 upwardly to elevate the platform 16 to the elevation of the truck bed 19.

Each of the actuator units 18 is preferably of the double-acting type to provide a positive movement in either direction. Any suitable pressurized fluid supply and associated control system may be connected to the cylinders 47 as at the diagrammatically indicated connections 47a for their operation. A typical pressurized fluid supply would include a fluid pump, either air or liquid, driven by a motor. For example, the pump motor may be of the electric type deriving its power from the vehicle to which the lift gate may be temporarily attached or a suitable supply outlet located at the load-transferring station. The pump may also be driven by the vehicle's engine through a mechanical connection and thereby provide a completely independent and mobile unit. Such pressurized fluid supply systems are well known and it is believed unnecessary to further describe a basic system or to include a system in the drawings as the general arrangement and connection to the actuators 18 will be readily apparent.

Further extension of the piston rods 49 from the cylinders 47 of the actuating units 18 will pivot the arms 45 and 46 through a greater arc. Concurrently with the pivoting of the arms 45 and 46, the platform 16 will be further elevated to position the plate 35 at a relatively higher position. This further elevating of the platform 16 to a position above the truck bed 19 by further extension of the piston rods 49 permits the platform to be stowed within the vehicle body. The actuating means 18 and the mechanical linkage 17 are thus effective in positioning the cargo-supporting platform in a stowed position between the upright struts 26 of the base frame structure for purposes of transportation with the vehicle. This position is best shown in FIGURE 6 and is utilized for transport of the lift gate by the utilizing vehicle to a location of the article or cargo-transferring operations.

The spacing of the upstanding columns 37 of the platform is less than the spacing of the struts 26 to permit positioning of the arms 45 and 46 of the linkage between the column and strut in the position of FIGURE 6. In the present embodiment, the ends of the arms 45 and 46 are pivotally secured to the struts 26 by bolts 52 extending through the ends of the respective arms and threaded into suitably formed sockets carried in the wall of the strut 26. Interposed between the ends of the arms 45 and 46 and the adjacent surface of the strut 26 is a spacing member 51 which provides an adequate space to permit the bracket 50 to clear the surface of the strut 26 on upward movement or swinging of the platform. The head of the bolt 52 threaded into the strut 26 is also countersunk within the arms 45 and 46 to permit clearance of the upstanding columns 37. The pivot bolts 52 connecting the outer ends of the arms 45 and 46 to the upstanding columns 37 need not be countersunk as the spacer 51 would also provide the necessary clearance. Thus, it will be seen that operation of the actuator units 18 to cause extension of the piston rod 49, as indicated in FIG. 6, will position the arms 45 and 46 in a substantially vertical position in alignment with the struts 26 of the base frame structure. Vertical positioning of the arms 45 and 46 will also position the upstanding columns 37 of the cargo-supporting platform in substantially vertical alignment with the struts 26. All components and elements of the lift gate will, therefore, be positioned within the confines of the van body and forwardly of the terminal end noted as 22.

To permit closing of the doors of the van body and further reduce required space for storage of the gate, it is also necessary that the plate 35 be pivoted to a vertical position, as indicated in FIG. 6. In this embodiment, the pivoting of the plate 35 is conveniently accomplished by means of an auxiliary lifting mechanism carried by the cargo-supporting platform. The auxiliary lifting mechanism, to be explained hereinafter more fully, may be utilized to elevate the plate 35 a distance upwardly from the base member 38. The relative elevation necessary is substantially equal to one-half of the width of the plate 35 to permit the plate to be swung to a vertical position as indicated. Subsequent to elevating of the plate 35 by means of the auxiliary lifting mechanism, the locking mechanism 41 is operated to release the plate from its fixed position relative to the upstanding columns 37. Operation of the locking mechanism 41 to release the plate in this manner will permit the plate to pivot about the shaft 39 on the support blocks 40 and the reinforcing ribs 36.

The locking mechanism 41 comprises a simple yoke member 55 which is pivotally attached to the end of the plate 35. As shown in FIGURE 5, the yoke 55 is carried by a bolt 56 carried by a pair of brackets 57 attached to the surface of the plate 35. The mounting of the yoke 55 allows the yoke to be swung from its locking position, shown in FIGURE 3, to the unlocked position indicated by the broken lines. When disposed in the locking position, the arms of the yoke 55 are positioned on opposite sides of the column 37 and will thereby prevent pivoting of the plate 35.

The auxiliary lifting mechanism incorporated in the cargo-supporting platform 16 is designed to facilitate the transfer of cargo to or from the van body through elevation of the plate 35 relative to the columns 37. Utilization of the auxiliary lifting mechanism enables the cargo to be transferred without operating the mechanical linkage 17 and the associated actuating means 18. In its normal operation, the cargo-supporting platform 16 would be disposed with the horizontal cross member 38 positioned on and supported by the ground surface, as indicated in FIGURES 1 and 2. When thus positioned, the linkage 17 and the base frame structure 15 will not be utilized other than to maintain the columns 37 in an upright position and prevent tipping. Elevating of the plate 35 to effect the transfer of cargo between the ground, indicated in FIGURES 1 and 2, and the van body, will thereby be entirely carried by the columns 37 of the cargo-supporting platform itself.

Each of the columns 37 is preferably of a box girder construction having a C-shaped cross section, as shown in FIGURE 5. The opening of the column 37 extends vertically and is disposed to face inwardly of the platform 16. The shaft 39 which carries the plate 35 is attached at each end to a relatively short, tubular sleeve 60 which is also of the C-shaped cross section but is of a size to fit within the interior of the column 37 and to slide longitudinally thereof. For reasons which will be subsequently apparent, the longitudinally extending opening of the sleeve 60 is opposed to that of the column 37. The shaft 39 is attached to one end of the sleeve 60 so as to be positioned at a lowermost position, see FIGURE 3, when the sleeve is resting on the bottom horizontal member 38. Elevation of the plate 35 is readily accomplished by moving the sleeves 60 upwardly through the columns 37 to the desired position. The sleeves 60 serve to guide the platform upwardly and maintain it in a substantially horizontal position. During the upward movement of the plate, the yoke 55 of the locking mechanism 41 will slide along the exterior surface of the columns 37 with the legs in engagement with opposite sides of the column and thereby continue to maintain the platform horizontal relative to a transverse pivoting movement.

The necessary force for elevating the plate 35 is provided by the cylinder and piston unit 61 of the fluid-operated type having a cylinder 62 and a relatively extendable piston rod 63. The cylinder 62 is supported in a vertical position with one end attached to the horizontal member 38 and is centrally located within the interior of the column 37 and the sleeve 60. The sleeve 60 may thus reciprocate in a vertical direction without interference. The rod end of the cylinder 62 projects upwardly allowing the piston rod 63 to extend in a vertical direction within the interior of the column 37. Attached to the end of the piston rod 63 is a bracket member 64 which carries a chain gear sprocket 65. Trained around the sprocket 65 is a load-supporting, link-type chain 66 having one end thereof rigidly secured to the upper end of the cylinder 62 by a suitable lug 67. In the retracted position of the piston rod 63, indicated in FIGURE 3, the chain 66 also extends downwardly along the exterior of the cylinder 62 with the other end thereof securely attached to the sleeve 60 by a lug 68. The lug 67 for attaching the chain 66 to the cylinder 62 is preferably secured to the surface of the cylinder opposite the opening in the column 37. The lug 67 and the chain 66 will thus be aligned with the longitudinally extending opening in the sleeve 60 to permit the sleeve to reciprocate the entire length of the column 37. As the sleeve 60 approaches the upper end of the column 37, the chain 66 and its attachment lug 67 will be guided through the opening of the sleeve. The opposite end of the chain 66 is attached to the sleeve 60 diametrically opposite the opening thereof and will be positioned within the opening of the column 37. Thus, as the plate 35 and the shaft 39 are elevated, not only will the ends of the shaft move longitudinally through the openings of the column 37 but the end of the chain 66 and its attachment lug 68 will also move along the opening.

The cylinder and piston actuating unit 61 is preferably of the double-acting type, having the pressurized fluid connections 62a which are connected to a suitable pressurized fluid system and control apparatus. The fluid pressure system and control apparatus may be that previously mentioned with such additional control apparatus as is necessary. As previously indicated, a detailed descritpion and drawings of such a system is omitted as it may be of conventional construction and, therefore, is believed well known.

When utilizing the auxiliary lifting mechanism of the cargo-supporting platform 16, the base member 38 thereof would normally be positioned on the ground surface. Thereafter, extension of the piston rod 63 will cause the plate 35 to be elevated from its lowermost position to the desired elevation. The desired elevation may be that of the floor of the van body into which the cargo is to be loaded or otherwise transferred. Because of the straight vertical lifting action of the auxiliary lifting mechanism the plate 35 may be utilized in lifting substantially heavier articles than may be possible with the use of the arms 45 and 46 of the linkage mechanism and its associated actuating means 18. If desired, however, the auxiliary lifting mechanism may be utilized in conjunction with the linkage arms 45 and 46 to increase the effective lifting height of the gate. This is indicated diagrammatically in FIGURE 1 where the plate 35 is shown in broken lines positioned at the upper end of the columns 37 and the linkage 17 has been operated to elevate the entire cargo-supporting platform to a position above the ground. This type of operation will facilitate the loading of the cargo or the unloading of cargo where the articles are stacked within the van body.

The auxiliary lifting mechanism is also utilized to facilitate stowing of the cargo-supporting platform within the van body for transport with the vehicle. For this operation, the piston rod 63 would be extended to elevate the sleeve 60 and the shaft 39 to a position where the plate 35 may be pivoted to a vertical position and clear the upper surface of the base member 38 (see FIG. 6).

FIGURES 7, 8, 9, and 10 illustrate a modified lift gate structure. The modification resides in the cargo-supporting platform 16a and the remainder of the lift gate will be the same as previously described including a base frame structure 15a, a mechanical interconnecting linkage 17a and an actuating means 18a. The cargo-supporting platform 16a in this modification is not provided with an auxiliary lifting mechanism but is of similar construction and includes upstanding columns 37a and a horizontal base member 38a which carry a rectangular plate 35a. The columns 37a are of simplified construction in this instance and are formed from simple channel members. The cargo-supporting plate 35a is also of rectangular shape but is normally supported on the upper surface of the channel-shaped base member 38a. A reinforcing rib 36a is secured to the upper surface of the plate at each end thereof. To prevent inadvertent tipping of the plate 35 when loads may be eccentrically positioned thereon, a brace structure is provided as best shown in FIGS. 7 and 9. The brace structure includes an elongated arm 70 attached at one end to the column 37a at a point disposed upwardly from the base member 38a. The opposite end of the arm 70 is attached to the plate 35 by means of a bracket 71. The bracket 71 comprises an upstanding lug welded to the rib 36a.

The operation of the modified lift gate will be the same as that previously described in connection with the linkage 17 and actuating means 18 of the preferred form. This operation consists of the normal movement of the cargo-supporting platform between load-transferring positions relative to the truck bed and to a ground position. It will also include the positioning of the cargo-supporting platform between the upright struts 26a of the base frame structure and indicated in FIGURE 8 for transport with the van body. To provide the necessary compact configuration for the transport position, it is necessary that the plate 35a be attached to the columns 37a by means permitting the pivoting of the plate 35a. Lifting of the plate 35a relative to the columns 37a is permitted by means of a U-shaped channel or bracket 72 having a pin 73 secured thereto which pivotally engages the rib 36a. The bracket 72 may be a relatively short channel section which is adapted to slidably engage the column 37a. Each bracket 72 may be slid upwardly along the channel 37a to a position where the plate 35a may be pivoted on the pin 73 to a vertical position. The brace arm 70 is also pivotally connected to the column 37a and to the bracket 71 to permit pivoting of the plate 35a. The connection to the column 37a is by a pin 74 welded to the inwardly facing side of the column and by a pin 75 joining and connecting the opposite end of the arm 70 to the bracket 71.

A lift gate of the modified platform construction may be carried within the van body by pivoting the plate 35a to a vertical position as shown in FIGURE 8. Pivoting of the plate 35a is accomplished by lifting upwardly on the edge of the plate opposite the brackets 71. This will cause the channel form brackets 72 to slide upwardly along the columns 37a and swing the edge of the plate to which the braces 70 are attached toward the columns 37. A suitable latching means (not shown) may be provided to retain the plate 35a in a vertical position for safety reasons.

Either embodiment of the lift gate may be readily removed from a van body and maintained at a central location if desired for utilization with other vehicles. To facilitate removal and storage of the lift gate, a support apparatus may be provided which is detachably engageable with the lift gate. The apparatus would be attached to the cargo-supporting platform and would be designed to support the gate in a position for attachment to a van body and may be of the wheeled, portable type to facilitate alignment. As an example of the utilization of a wheeled support apparatus, assuming that the lift gate has been mounted on a van body, the wheeled support apparatus would be positioned beneath the cargo-supporting platform and the platform lowered onto the apparatus. The platform would then be rigidly secured if necessary to the wheeled apparatus. Subsequently, the clamping mechanism 27 may be disengaged from the upper header 24 of the van body and the screwjack 31 operated to fully release the base frame structure 15 from the van body. After release of the base frame structure 15 from the van body, the entire lift gate may be removed from the vicinity of the truck and the actuating means 18 may be operated to lower the base frame structure to a more convenient height. For purposes of transportation or storage, the lift gate would be arranged substantially as indicated in FIGURE 6 or 8, as determined by the particular model of the lift gate, to increase the stability during movement on the apparatus and to minimize the space required for storage.

It is readily apparent that the vehicle lift gate of this invention is of particular advantage in that it may be detachably mounted on a suitable vehicular body. The detachable mounting greatly enhances the utilization of the lift gate as it may be mounted on a vehicle which requires the use of a lift gate for a specific operation and then removed from the vehicle when its use will not be required. The interchangeability is effected through a simple mounting structure which minimizes the time required to mount or to remove the gate. The lifting mechanism is of simple, rugged construction and the entire gate may be readily positioned completely within the vehicular cargo-carrying body.

According to the provisions of the patent statutes, the principles of this invention have been explained and have been illustrated and described in what is now considered to represent the best embodiment. However, it is to be understood that, within the scope of the appended claims, the invention may be practiced otherwise than as specifically illustrated and described.

Having thus described this invention, what is claimed is:

1. A lift gate for a cargo-carrying vehicle comprising a base frame structure detachably mountable on the vehicle, said base frame structure including a base member releasably engageable with the floor of the vehicle's cargo-carrying space and a pair of upstanding struts secured to said base member in relatively spaced relationship, each of said struts having means releasably engageable with said vehicle to maintain said struts in an upright position, a cargo- supporting platform, a mechanical linkage interconnecting said base frame structure with said cargo supporting platform and being operable to effect vertical displacement of said platform relative to said frame structure between a load-transferring position relative to the vehicle and a second load-transferring position and alternatively to position said platform within the space defined by said base frame structure, and actuating means operatively connected between said linkage mechanism and said base frame structure and being selectively operable to actuate said linkage.

2. A lift gate according to claim 1 wherein said interconnecting mechanical linkage is attached to said struts and said cargo-supporting platform is positionable between said struts.

3. A lift gate for a cargo-carrying vehicle comprising a base frame structure detachably mountable on the vehicle, a cargo-supporting platform including a rigid frame, a plate adapted to normally receive and support cargo thereon carried by said rigid frame for elevating movement relative thereto, and means connected with said plate for effecting said relative movement, a mechanical linkage interconnecting said base frame structure with the rigid frame of said cargo-supporting platform and being operable to effect vertical displacement of said platform relative to said frame structure between a load-transferring position relative to the vehicle and a second load-transferring position and alternatively to position said platform within the space defined by said base frame structure, and actuating means operatively connected between said linkage mechanism and said base frame structure and being selectively operable to actuate said linkage.

4. A lift gate according to claim 3 wherein said cargo-supporting platform includes actuating means operatively connected to said plate and being selectively operable to elevate said plate relative to said frame.

5. A lift gate according to claim 3 wherein said rigid frame includes a pair of spaced-apart columns maintained in a vertical position and said plate extends between said columns, having attaching means which is slidably engageable with said columns to permit vertical movement of said plate relative to said columns.

6. A lift gate according to claim 5 wherein said plate is supported between said columns for pivotal movement about a horizontal axis.

7. A lift gate for a cargo-carrying vehicle comprising a base frame structure detachably mountable on the vehicle, said base frame structure including an elongated base member adapted to be disposed in releasable engagement with the floor of the vehicle's cargo-carrying space and a pair of upstanding struts secured to said base member in relatively spaced relationship, each of said struts having means releasably engageable with the vehicle for maintaining said struts in an upright position, a cargo-supporting platform including a rigid frame and a plate adapted to receive and support cargo on a surface thereof, said plate being carried by said rigid frame for rotation about a horizontal axis for selective positioning of said plate with the surface thereof disposed in either a horizontal or a vertical plane, a mechanical linkage interconnecting said base frame structure struts with the frame of said cargo-supporting platform and being operable to effect vertical displacement of said platform relative to said base frame structure between a load transferring position relative to the vehicle and a second load transferring position and alternately to position said platform between the struts of said base frame structure where the plate of said platform may be positioned with the surface thereof disposed in a vertical plane, and actuating means operatively connected with said linkage mechanism and said base frame structure and being selectively operable to actuate said linkage.

References Cited by the Examiner

UNITED STATES PATENTS 2,761,571 9/1956 Adams.
2,889,059 6/1959 Selzer.

GERALD M. FORLENZA, Primary Examiner.

HUGO O. SCHULZ, Examiner.